United States Patent
Hao

(10) Patent No.: US 10,887,760 B2
(45) Date of Patent: Jan. 5, 2021

(54) DEVICE, METHOD, AND PROGRAM PRODUCT FOR ESTABLISHING A DATA CONNECTION

(71) Applicant: Lenovo (Beijing) Limited, Beijing (CN)

(72) Inventor: Zhuangzhuang Hao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 209 days.

(21) Appl. No.: 15/342,004

(22) Filed: Nov. 2, 2016

(65) Prior Publication Data

US 2017/0127270 A1 May 4, 2017

(30) Foreign Application Priority Data

Nov. 2, 2015 (CN) .......................... 2015 1 0731652

(51) Int. Cl.

| H04W 8/24 | (2009.01) |
|---|---|
| H04W 76/19 | (2018.01) |
| H04W 76/15 | (2018.01) |
| H04W 8/12 | (2009.01) |
| H04W 8/08 | (2009.01) |
| H04W 4/50 | (2018.01) |
| H04W 4/60 | (2018.01) |

(52) U.S. Cl.
CPC ............... *H04W 8/24* (2013.01); *H04W 8/08* (2013.01); *H04W 8/12* (2013.01); *H04W 76/15* (2018.02); *H04W 76/19* (2018.02); *H04W 4/50* (2018.02); *H04W 4/60* (2018.02)

(58) Field of Classification Search
CPC ......... H04W 8/08; H04W 8/24; H04W 76/15; H04W 76/19; H04W 8/12; H04W 4/50; H04W 4/60; H04W 8/18; H04W 48/18
See application file for complete search history.

(56) References Cited

U.S. PATENT DOCUMENTS 5,987,325 A * 11/1999 Tayloe ................. H04B 1/3816
  379/357.01
8,737,318 B2 * 5/2014 Fan ....................... H04M 15/00
  370/329

(Continued)

FOREIGN PATENT DOCUMENTS

| CN | 1487770 A | 4/2004 |
|---|---|---|
| CN | 101222712 A * | 7/2008 |

(Continued)

*Primary Examiner* — Un C Cho
*Assistant Examiner* — Shah M Rahman
(74) *Attorney, Agent, or Firm* — Kunzler Bean & Adamson

(57) ABSTRACT

One method for establishing a data connection includes establishing a first data connection between a mobile communication device and a wireless network. The method also includes sending a request to a remote server via the first data connection to retrieve data for establishing a local data connection between the mobile communication device and a communication network, said request including information relating to an identification card of the mobile communication device. The method includes receiving said data from the remote server. The method also includes re-establishing a local data connection between the mobile communication device and the communication network based on said data as received from the remote server.

14 Claims, 5 Drawing Sheets

(56) References Cited

U.S. PATENT DOCUMENTS

| | | | |
|---|---|---|---|
| 9,282,456 B2* | 3/2016 | Gupta | H04L 63/205 |
| 2008/0020755 A1* | 1/2008 | Liu | H04W 8/245 |
| | | | 455/432.1 |
| 2008/0162715 A1* | 7/2008 | Wary | H04L 41/0853 |
| | | | 709/231 |
| 2010/0311402 A1* | 12/2010 | Srinivasan | H04W 8/183 |
| | | | 455/418 |
| 2010/0311404 A1* | 12/2010 | Shi | H04W 8/205 |
| | | | 455/419 |
| 2010/0311468 A1* | 12/2010 | Shi | H04M 15/8038 |
| | | | 455/558 |
| 2011/0028135 A1* | 2/2011 | Srinivasan | H04M 3/42382 |
| | | | 455/415 |
| 2011/0269461 A1* | 11/2011 | Xu | H04W 8/183 |
| | | | 455/435.2 |
| 2012/0115439 A1* | 5/2012 | Naito | H04L 63/0853 |
| | | | 455/411 |
| 2012/0144189 A1* | 6/2012 | Zhong | H04L 63/0853 |
| | | | 713/155 |
| 2014/0185526 A1* | 7/2014 | Aksu | H04W 4/50 |
| | | | 370/328 |
| 2015/0105049 A1* | 4/2015 | Golaup | H04L 63/0892 |
| | | | 455/411 |
| 2015/0215773 A1* | 7/2015 | Bai | H04W 8/245 |
| | | | 455/418 |
| 2015/0281966 A1* | 10/2015 | Griot | H04W 12/08 |
| | | | 726/5 |
| 2015/0304506 A1* | 10/2015 | Zhu | H04M 15/49 |
| | | | 455/406 |
| 2015/0365816 A1* | 12/2015 | Timonen | H04B 1/3816 |
| | | | 455/558 |
| 2016/0007190 A1* | 1/2016 | Wane | H04W 4/50 |
| | | | 455/419 |
| 2016/0094930 A1* | 3/2016 | Ramanna | H04W 8/205 |
| | | | 455/558 |
| 2016/0183178 A1* | 6/2016 | Marimuthu | H04W 4/023 |
| | | | 455/432.1 |
| 2016/0323256 A1* | 11/2016 | Shahidi | H04L 63/18 |

FOREIGN PATENT DOCUMENTS

| | | | |
|---|---|---|---|
| CN | 103916844 A | * | 7/2014 |
| CN | 103987025 A | * | 8/2014 |
| CN | 104144402 A | | 11/2014 |
| CN | 104717629 A | | 6/2015 |
| CN | 104717630 A | | 6/2015 |

* cited by examiner

DEVICE, METHOD, AND PROGRAM PRODUCT FOR ESTABLISHING A DATA CONNECTION

FIELD

The subject matter disclosed herein relates to mobile communication devices, and in particular to a method for establishing a data connection between the mobile communication device and a communication network.

BACKGROUND

With smart terminals and wireless network technology, users may use the same terminal at different locations to access the Internet. Different locations may be covered by different communication networks. In certain environments, users may pay roaming data service charges for data transmission. These roaming data service charges may be expensive in conditions in which international roaming is used. In certain configurations, a user's data charges may be reduced during international roaming. This may be accomplished by obtaining key information ("Ki") of a user identification card. One way to do this is to preset the user identification cards for a number of countries within a terminal, and when the user is roaming in one of those countries, a corresponding user identification card may be activated and may localize roaming traffic. However, this may waste user identification card (number segment) resources.

SUMMARY

A method for establishing a data connection is disclosed. Devices and program products also perform the functions of the method. In one embodiment, the method includes establishing a first data connection between a mobile communication device and a wireless network. The method also includes sending a request to a remote server via the first data connection to retrieve data for establishing a local data connection between the mobile communication device and a communication network, said request including information relating to an identification card of the mobile communication device. The method includes receiving said data from the remote server. The method also includes re-establishing a local data connection between the mobile communication device and the communication network based on said data as received from the remote server.

In certain embodiments, the method includes performing a data transmission between the mobile communication device and the communication network based on the local data connection. In some embodiments, the server stores data relating to identification cards for multiple communication networks corresponding to different roaming locations. In various embodiments, the method includes generating said request for sending to the server, and generating said request includes: detecting the communication network; obtaining a first parameter of the communication network; obtaining a second parameter of the communication network; and generating the request based on the first parameter and the second parameter.

In one embodiment, the mobile communication device includes at least one communication subunit, and the method further includes, before the mobile communication device establishes the first data connection: determining whether the mobile communication device has an available communication subunit of the at least one communication subunit; obtaining a result in response to determining whether the mobile communication device has an available communication subunit of the at least one communication subunit; and, in response to the result indicating an available communication subunit, loading the available communication subunit with the information relating to the identification card of the mobile communication device.

In certain embodiments, in response to the result indicating an absence of an available communication subunit, the method includes: unloading a user identification card in a communication subunit of the at least one communication subunit; and loading the communication subunit with the information relating to the identification card of the mobile communication device. Said information may be used for establishing a third data connection between the mobile communication device and the communication network before roaming.

In some embodiments, establishing the first data connection with the communication network includes: reading the information relating to the identification card of the mobile communication device; and establishing the first data connection based on the information.

In various embodiments, establishing the local data connection between the mobile communication device and the communication network includes: unloading the information relating to the identification card of the mobile communication device; loading said data as received from the server onto the identification card of the mobile communication device; reading said data as loaded onto the identification card of the mobile communication device; and establishing the local data connection between the mobile communication device and the communication network based on said data as loaded onto the identification card of the mobile communication device.

In one embodiment, said request for sending to the server is automatically generated while the mobile communication device is in a roaming mode.

One mobile communication device for establishing a data connection includes a processor and a wireless transceiver coupled to the processor. The mobile communication device also includes an identification card coupled to the processor. The processor is operable to: establish a first data connection between the wireless transceiver and a wireless network; send a request to a remote server via the wireless transceiver to retrieve data for establishing a local data connection with a communication network, said request including information relating to the identification card; receive said data from the remote server; and re-establishing a local data connection with the communication network based on said data as received from the remote server.

One program product for establishing a data connection includes a computer readable storage medium that stores code executable by a processor. The executable code includes code to perform: establishing a first data connection between a mobile communication device and a wireless network; sending a request to a server via the first data connection to retrieve data for establishing a local data connection between the mobile communication device and a communication network, said request including information relating to an identification card of the mobile communication device; receiving said data from the server; and re-establishing a local data connection between the mobile communication device and the communication network based on said data as received from the server.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
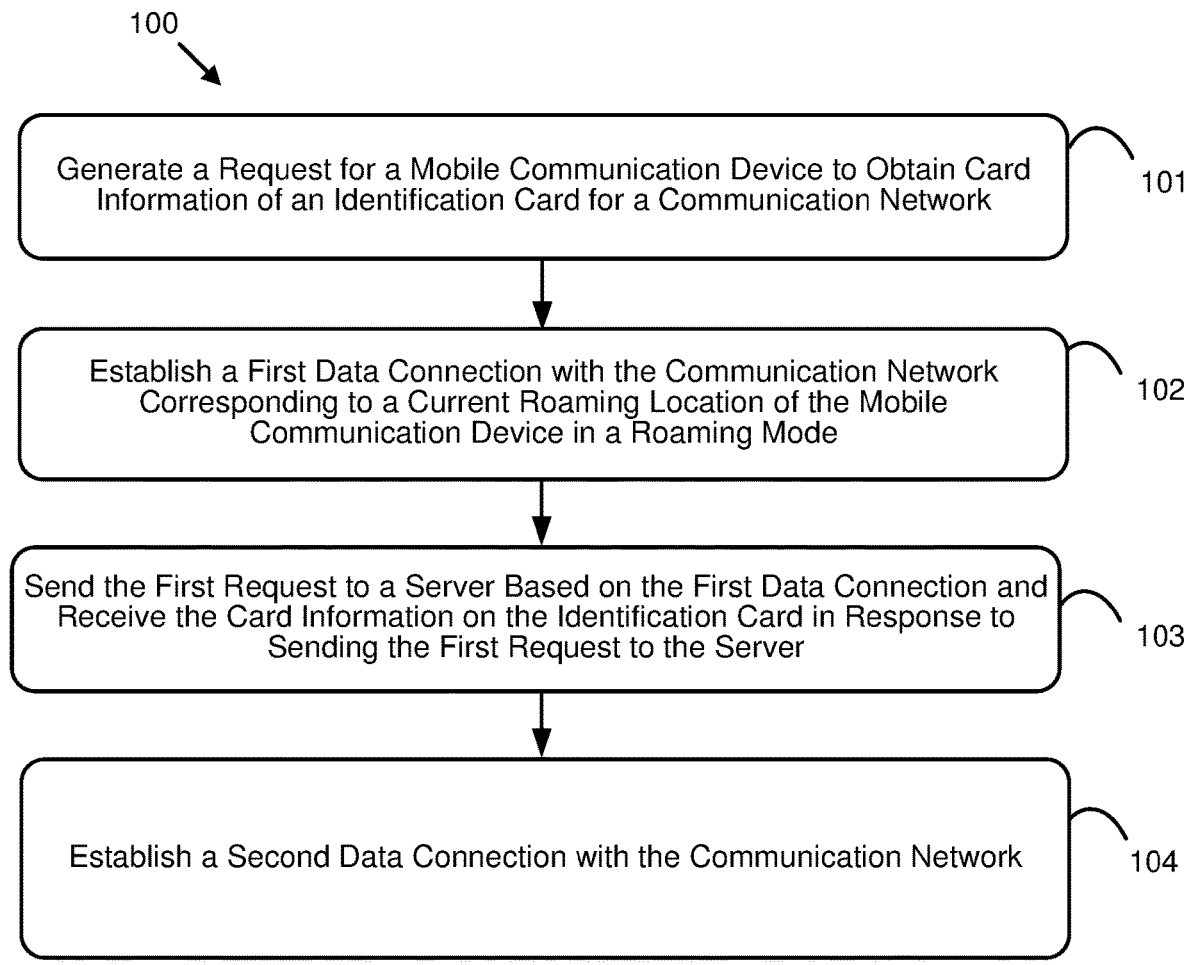
FIG. 1 illustrates a schematic flow chart diagram of an embodiment of a method for establishing a data connection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As described herein, a mobile communication device may be any suitable variety of mobile terminals, for example, a mobile phone, a tablet computer, and a laptop computer, or may be a portable, pocket, handheld, computer-built-in or vehicle-mounted mobile apparatus. The mobile communication device may perform wireless network access for voice and/or data exchanging over various communication networks. In certain embodiments, the communication network may be a Global System for Mobile ("GSM") communication network, a Code Division Multiple Access ("CDMA") network, a Wideband Code Division Multiple Access ("WCDMA") network, a Long Term Evolution ("LTE") communication network, or the like. Different types of communication networks may be operated by different carriers. The type of the communication network does not limit the embodiments of the present disclosure.

As found in the following embodiments, a mobile phone is used as one embodiment of the mobile communication device. In certain embodiments, after a mobile phone user leaves a usual place of residence and arrives in a roaming location, the user is roaming (e.g., the mobile phone is in a roaming mode). In one example using international roaming, a mobile phone user in international roaming is using a network provided by a foreign carrier. As such, the rates for international roaming may be determined based on a protocol between carriers of two countries or regions, and the data service charges for international roaming in certain countries or regions may be higher than domestic data service charges. For cost saving, the mobile phone user may purchase a SIM card for the roaming location, go to the communication network carrier's store in the roaming location for related services, and/or purchase a phone card for the roaming location. These actions for cost saving may be inconvenient.

FIG. 1 illustrates a schematic flow chart diagram of an embodiment of a method 100 for establishing a data connection. The method 100, in one embodiment, may be performed by a mobile communication device. The method 100 includes generating 101 a first request for a mobile communication device to obtain card information of an identification card for a communication network.

The method 100 includes establishing 102 a first data connection with the communication network that corresponds to a current roaming location of the mobile communication device in a roaming mode. The first data connection is established based on card information of a preset card. The method 100 includes sending 103 the first request to a server based on the first data connection and receiving the card information of the identification card in response to sending the first request to the server. The server may manage identification cards for M communication networks corresponding to different roaming locations. In certain embodiments, M is a positive integer. The method 100 includes establishing 104 a second data connection with the communication network, wherein the second data connection is established based on the card information of the identification card. In some embodiments, the method 100 includes performing a data transmission based on the second data connection.

In the present disclosure, "roaming" and/or a "roaming mode" may refer to a mobile communication device being in a country, region, and/or province to which the user identification card on the mobile communication device does not belong. For example, if a mobile communication device A1 supports two user identification cards, A2 and A3, wherein the user home location of the user identification card A2 is Beijing, and the user home location of the user identification card A3 is Shanghai, then the mobile communication device A1 is roaming when the mobile communication device A1 is located in Hong Kong. As another example, when the mobile communication device A1 is in Beijing then the mobile communication device A1 is not roaming because the user home location of the user identification card A2 is Beijing; similarly, when the mobile communication device A1 is in Shanghai, then the mobile communication device A1 is not roaming.

In some embodiments, the card information of the first preset card enables the mobile communication device to establish a data connection with at least one communication network of M communication networks.

In various embodiments, the server may be configured as a cloud server for card management. As such, the server may include a card pool having a database containing numbers of complete card information (e.g., multiple cards from different carriers in a number of countries). In some embodiments, the server may contain the identification cards for M communication networks corresponding to different roaming locations. When a mobile communication device sends a first request, the server may identify the appropriate identification card for the user's roaming location and send the corresponding card information to the mobile communication device. The identification card may be set as VSIM-local.

In various embodiments, a SIM card (e.g., physical user identification card) may contain a large amount of information, such as an International Mobile Subscriber Identity ("IMSI"), an Integrated Circuit Card Identifier ("ICCID"), contact information, a Public Land Mobile Network ("PLMN"), and the like, which may be obtained by accessing the SIM card. In certain embodiments, information Ki may be used by a network for identification (e.g., authentication) and/or encryption (e.g., to ensure information is encrypted during information exchange between a mobile phone and a network) of the SIM card. The information Ki may not be obtained through interactions with the SIM. In some embodiments, both authentication and encryption may be done in the SIM card, and the SIM card may return the results of the authentication and/or the encryption. In some embodiments, card information includes the information Ki.

Because card information of an identification card for a communication network corresponding to a current roaming location (e.g., VSIM-local information) is obtained from a server, a user has to be able to access a network at the current roaming location. However, because a user's personal user identification card may not facilitate data roaming function overseas, and/or a WI-FI network may not have continuous coverage, a card may be preset in the mobile communication device. For example, a card preset in the mobile communication device may be a first preset card (i.e., VSIM-Te).

It may be noted that the cards represented by VSIM-local and VSIM-Te may both be virtual user identification cards (e.g., a piece of card information that allows the mobile communication device to register for the network). One difference between VSIM-local and VSIM-Te may be that VSIM-local is an identification card for the mobile communication device's roaming location, and VSIM-Te is an international roaming card (which may establish a data connection with at least one of M communication networks). The VSIM-Te may be pre-fixed in the mobile communication device. In some embodiments, a data connection with a communication network corresponding to a current roaming location may be established using the data roaming ability provided by the first preset card VSIM-Te, and thereby download the information of the identification card (e.g., VSIM-local information) from the server to the mobile communication device at any time and any location. It may be noted that the VSIM-local and VSIM-Te may, in certain embodiments, be implemented via physical user identification cards.

After the mobile communication device has established a data connection with the communication network corresponding to the current roaming location based on the card information of the first preset card (e.g., VSIM-Te information), the mobile communication device may send the first request to the server, obtain the card information of the identification card (e.g., VSIM-local information), and establish a data connection with the communication network corresponding to the current roaming location based on the card information of the identification card. The mobile communication device may also perform the data service transmission within the communication network.

In certain embodiments, generating the first request for the mobile communication device to obtain card information of the identification card for the communication network corresponding to the current roaming location includes: detecting the communication network; obtaining a first parameter of the communication network; obtaining a second parameter of the communication network; and generating the first request based on the first parameter and the second parameter.

As described herein, the mobile communication device may detect the current communication network via its own roaming module. The first parameter may be in a communication mode of the communication network corresponding to the current roaming location, and the like. The second parameter may be a capability of the mobile communication device to support that communication mode. For example, the second parameter may be the capability of a modem within the mobile communication device to support the communication mode.

In various embodiments, as long as the user terminal does not enable a function for data international roaming, and, in the absence of any physical user identification card, the registration of the user identification card for the communication network at the roaming location enables the mobile communication device to use the mobile communication network at the roaming location to conduct data service transmission, and thereby save cost on roaming data service. In certain embodiment's, due to the settings of the first preset card, the mobile communication device may enable the roaming service at anytime and anywhere.

Figure 2:
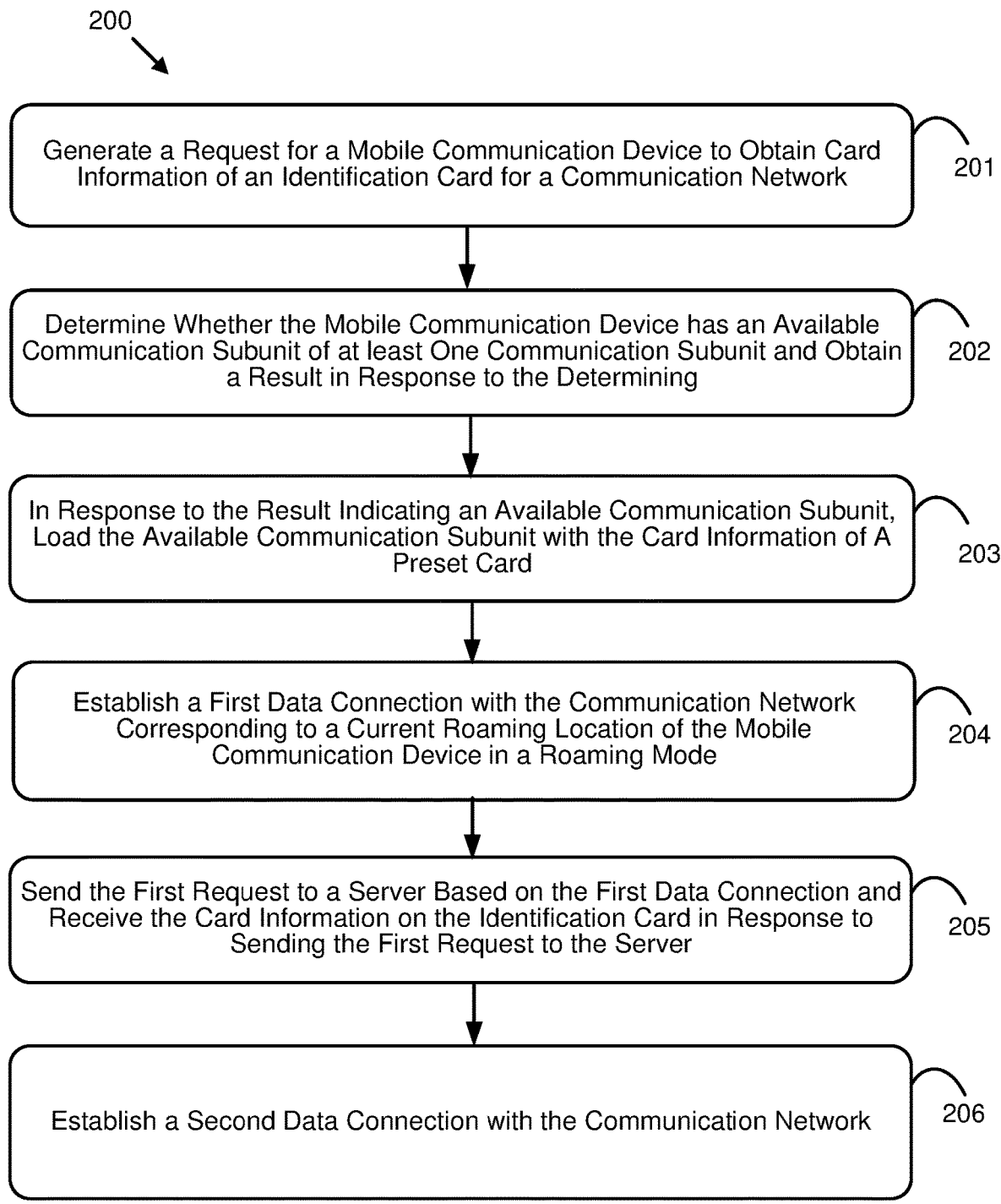
FIG. 2 illustrates a schematic flow chart diagram of another embodiment of a method for establishing a data connection.

FIG. 2 illustrates a schematic flow chart diagram of another embodiment of a method 200 for establishing a data connection. The method 200 includes generating 201 a first request for a mobile communication device to obtain card information of an identification card for a communication network. The method 200 also includes determining 202 whether the mobile communication device has an available communication subunit of at least one communication subunit and obtaining a result in response to determining whether the mobile communication device has an available communication subunit of the at least one communication subunit.

The method 200 includes in response to the result indicating an available communication subunit, loading 203 the available communication subunit with the card information of the preset card. The method 200 includes establishing 204 a first data connection with the communication network that corresponds to a current roaming location of the mobile communication device in a roaming mode. The first data connection is established based on card information of a preset card. The method 200 includes sending 205 the first request to a server based on the first data connection and receiving the card information of the identification card in response to sending the first request to the server. The server may manage identification cards for M communication networks corresponding to different roaming locations. In certain embodiments, M is a positive integer. The method 200 includes establishing 206 a second data connection with the communication network, wherein the second data connection is established based on the card information of the identification card. In some embodiments, the method 200 includes performing a data transmission based on the second data connection.

As an embodiment, if the mobile communication device has two communication subunits, such as two modulation and demodulation modules, and if one modulation and demodulation module is free (no insertion or activation of the corresponding physical user identification card), the communication subunit will be loaded with the card information of the first preset card (Vsim-Te information).

In certain embodiments, in response to the result indicating an absence of an available communication subunit, the method 200 may include: unloading a user identification card in a communication subunit of the at least one communication subunit; and loading the communication subunit with the card information of the preset card, wherein the user identification card is used for establishing a third data connection between the mobile communication device and the communication network before roaming.

In some embodiments, if the mobile communication device has two communication subunits (e.g., two modulation and demodulation modules) and if both modulation and demodulation modules are in working status (e.g., the corresponding physical user identification cards have been inserted and activated), the user identification card corresponding to one of the modulation and demodulation modules will be unloaded, and the communication subunit will be loaded with the card information of the first preset card (e.g., VSIM-Te information). As used herein, the "to unload" the physical user identification card does not mean to remove the user identification card (e.g., physical card) from the card slot, but instead means to replace the corresponding information of the user identification card (e.g., network access information, etc.) with the card information of the first preset card.

In various embodiments, establishing the first data connection with the communication network includes reading the card information of the available communication subunit, and establishing the first data connection based on the card information read from the available communication subunit.

In some embodiments, establishing the second data connection with the communication network includes: unloading the card information of the preset card in the available communication subunit; loading the available communication subunit with the card information of the identification card; reading the card information of the available communication subunit; and establishing the second data connection based on the card information read from the available communication subunit.

In certain embodiments, the method 200 includes generating a second request while the mobile communication device is in the roaming mode. In such embodiments, the second request indicates to the server a reassignment of the card information of the identification card. Moreover, the method 200, in such embodiments, also includes sending the second request to the server, and unloading the card information of the identification card from the available communication subunit in response to sending the second request to the server.

In some embodiments, the mobile communication device generates the second request before it quits roaming (e.g. the mobile communication device is about to return to its origin from the roaming location), and sends the second request to the server via the communication network corresponding to the current roaming location to inform the server to recover the card information of the identification card that is currently used by the mobile communication device, that is, to inform the server that the mobile communication device is not going to use the card information of that identification card any more, and it may reassign the card information of that identification card to other mobile communication devices that are roaming at the location.

Figure 3:
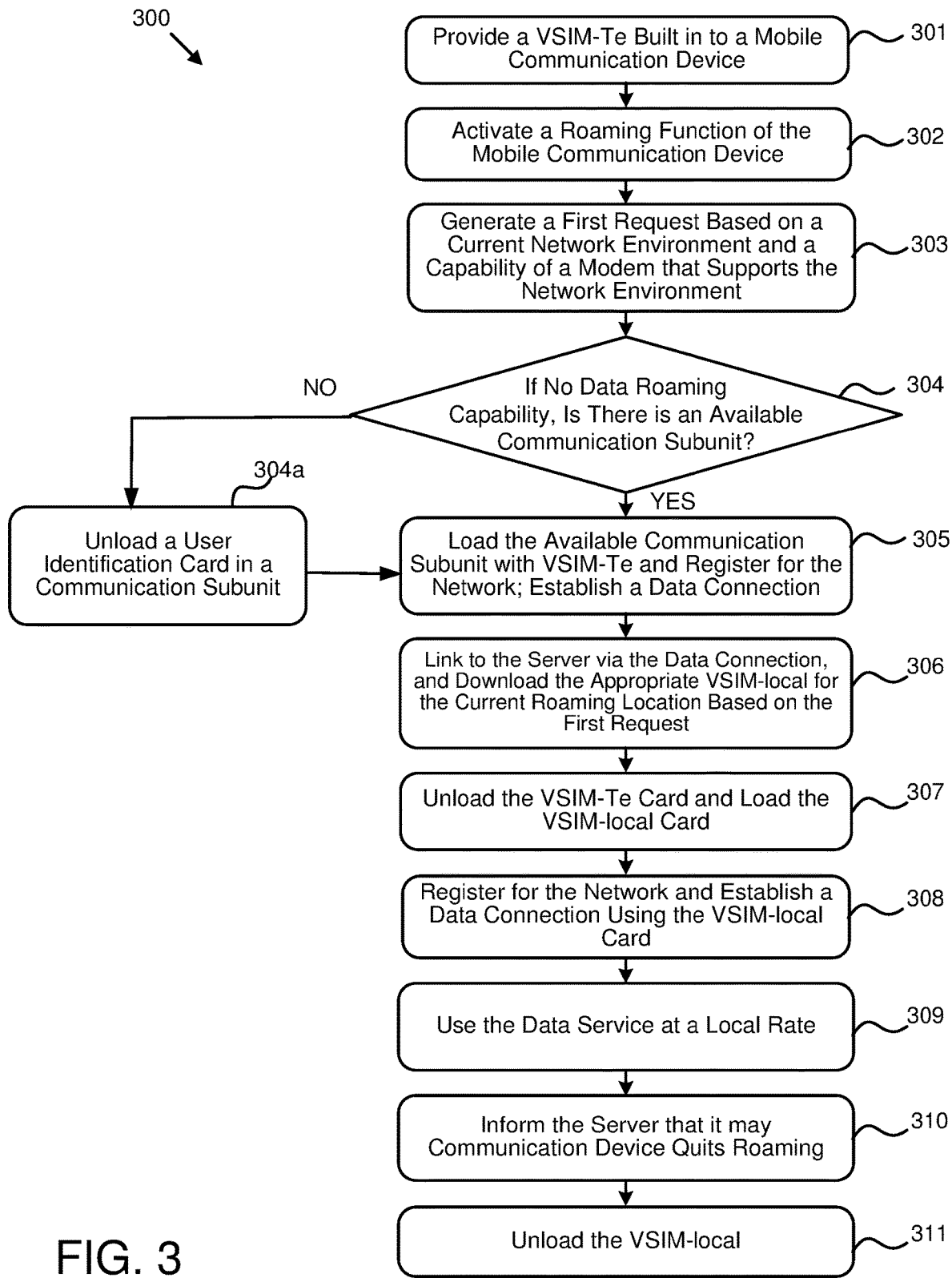
FIG. 3 illustrates a schematic flow chart diagram of a further embodiment of a method for establishing a data connection.

FIG. 3 illustrates a schematic flow chart diagram of a further embodiment of a method 300 for establishing a data connection. The method 300 includes providing 301 a VSIM-Te built in to a mobile communication device. The method 300 includes activating 302 a roaming function of the mobile communication device. The method 300 also includes generating 303 a first request based on a current network environment and a capability of a modem that supports the network environment. The method 300 includes determining 304, if the mobile communication device has determined that it has no data roaming capability, whether the mobile communication device has an available communication subunit. If the mobile communication device does not have an available communication subunit, the method 300 unloads 304a a user identification card in a communication subunit, then the method 300 loads 305 the available communication subunit with VSIM-Te, registers for the network, and establishes a data connection. If the mobile communication device has an available communication subunit, the method loads 305 the available communication subunit with VSIM-Te, registers for the network, and establishes a data connection.

The method 300 links 306 the mobile communication device to the server via the data connection, and downloads the appropriate VSIM-local for the current roaming location based on the first request. The method 300 unloads 307 the VSIM-Te card and loads the VSIM-local card. As used herein, an interactive process, such as ATR, PPS and the like, takes place between the VSIM-local card and the modem, and the card information of the VSIM-local is passed to the modem according to the modem's requirements. The card information of the VSIM-local may include IMSI, PLMN, the result of authentication, and so forth.

The method 300 registers 308 for the network and establishes a data connection using the VSIM-local card. The method 300 uses 309 the data service at a local rate. The method 300 informs 310 the server that it may reassign (e.g., recover) the VSIM-local in response to the mobile communication device no longer roaming. The method 300 unloads 311 the VSIM-local.

As may be appreciated, if the mobile communication device has previously unloaded a user identification card, it may load the user identification card that has been previously unloaded.

It should be noted that the actions of unloading and loading the card are both the loading or unloading of the corresponding card information without physically inserting and removing the actual card (e.g., physical card) in the card slot.

As set forth above, provided that the user terminal does not enable international data roaming, and in the absence of any physical user identification card, the registration of the user identification card for the communication network at the roaming location enables the mobile communication device to use the mobile communication network at the roaming location to conduct data service transmission, and thereby save cost on roaming data service. Due to the settings of the first preset card, the mobile communication device may enable the roaming service at any time and/or any location. Furthermore, if the mobile communication device is using the identification card corresponding to a roaming location, the resource of such identification card is occupied. Once the mobile communication device quits roaming, the identification card may be reassigned by the server to other mobile communication devices that are in roaming at that location, and, thus, the identification card resource may be used. Such embodiments may save a hardware cost of using an actual identification card.

Figure 4:
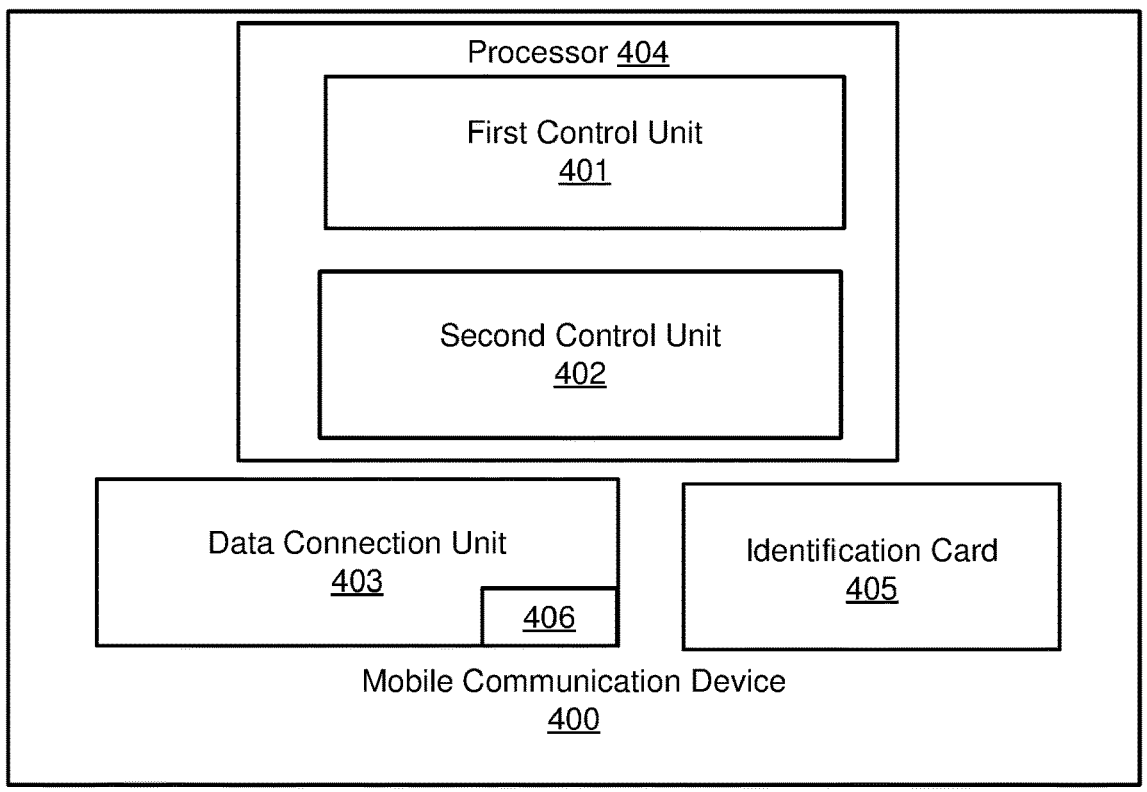
FIG. 4 illustrates a schematic block diagram of an embodiment of a mobile communication device.

FIG. 4 illustrates a schematic block diagram of an embodiment of a mobile communication device 400. The mobile communication device 400 includes a processor 404 (which may include a first control unit 401 and a second control unit 402), a data connection unit 403, and an identification card 405. The identification card 405 may be coupled to the processor 404 and may be used to store information used for establishing a data connection.

The data connection unit 403 may include a wireless transceiver 406 coupled to the processor 404. The data connection unit 403 establishes a data connection with a communication network. The first control unit 401 generates a first request for the mobile communication device to obtain card information of an identification card for the communication network. The second control unit 402 controls the data connection unit 403 to establish a first data connection with the communication network corresponding to a current roaming location of the mobile communication device in a roaming mode. The first data connection is established based on card information of a preset card. The second control unit 402 sends the first request to a server based on the first data connection and receives the card information of the identification card in response to sending the first request to the server. The second control unit 402 also controls the data connection unit 403 to establish a second data connection with the communication network. The second data connection is established based on the card information of the identification card.

In some embodiments, the data connection unit 403 performs a data transmission based on the second data connection. In various embodiments, the server manages identification cards for M communication networks (e.g., multiple communication networks) corresponding to different roaming locations, and M is a positive integer.

In various embodiments, the card information of the first preset card enables the mobile communication device to establish a data connection with at least one communication network of the M communication networks.

Figure 5:
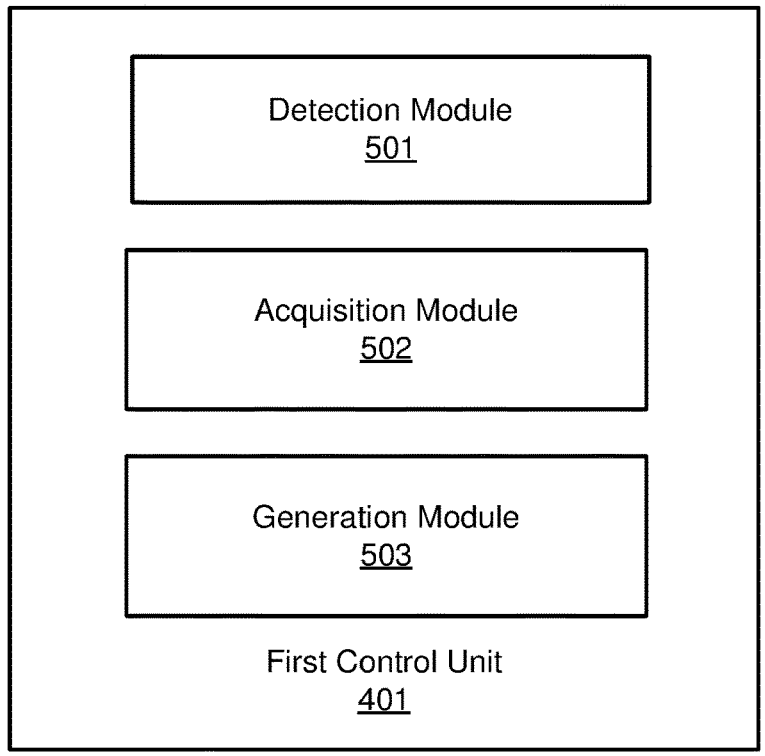
FIG. 5 illustrates a schematic block diagram of an embodiment of a first control unit.

FIG. 5 illustrates a schematic block diagram of an embodiment of the first control unit 401. The first control unit 401 includes a detection module 501, an acquisition module 502, and a generation module 503.

The detection module 501 detects the communication network and obtains a first parameter of the communication network. The acquisition module 502 obtains a second parameter of the communication network. The generation module 503 generates the first request based on the first parameter and the second parameter.

As found herein, the mobile communication device may detect the current communication network via its own roaming module, the first parameter may be in a communication mode of the communication network corresponding to the current roaming location, and the like. The second parameter may be the capability of the mobile communication device to support that communication mode, that is, the capability of the modem within the mobile communication device to support the communication mode.

Thus, if the user terminal does not enable international data roaming, and in the absence of any physical user identification card, the registration of the user identification card for the communication network at the roaming location enables the mobile communication device to use the mobile communication network at the roaming location to conduct data service transmission. Therefore, cost on roaming data service may be reduced, and because of the setting of the first preset card, the mobile communication device may enable the roaming service at any time and/or any location.

Figure 6:
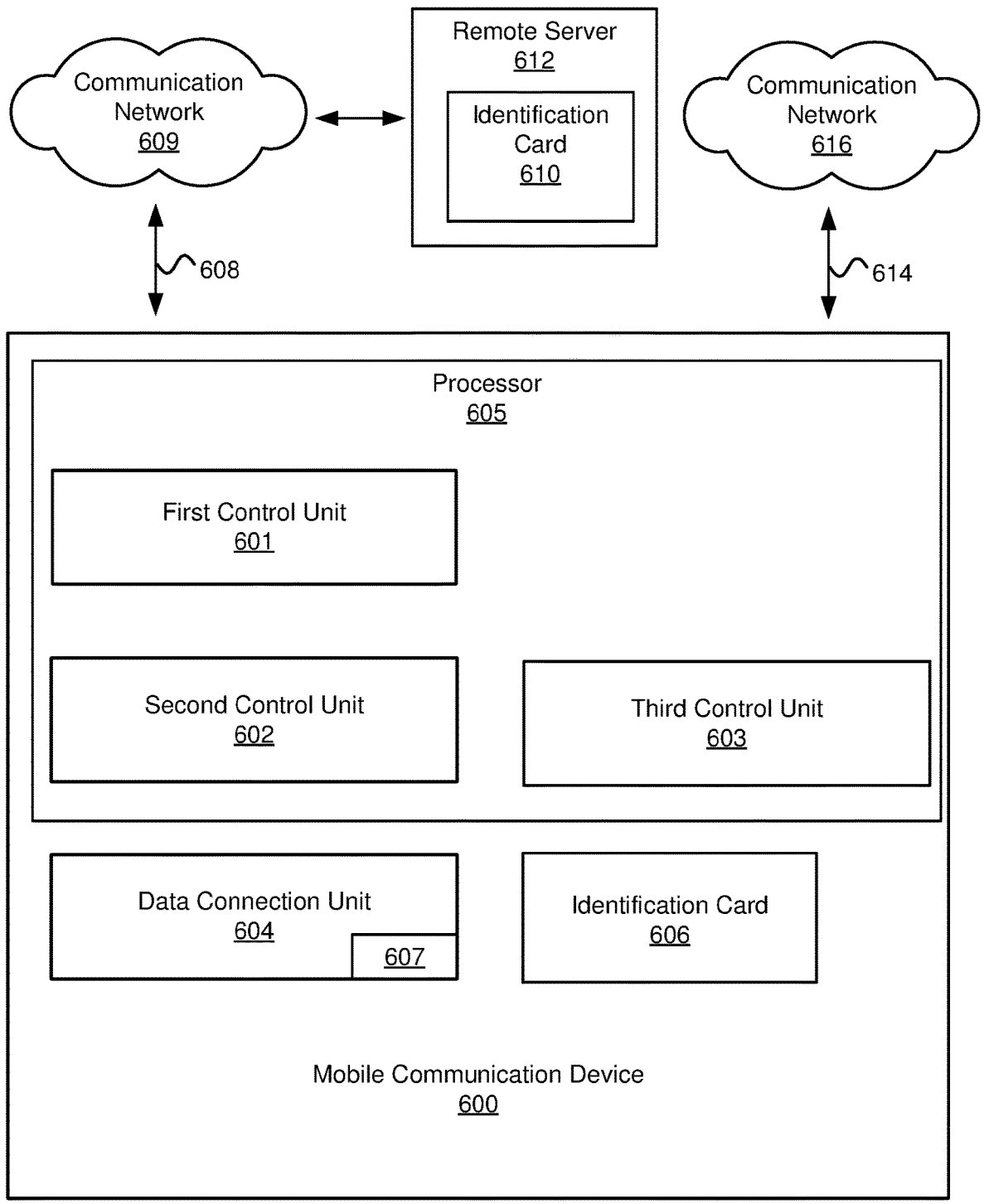
FIG. 6 illustrates a schematic block diagram of another embodiment of a mobile communication device.

FIG. 6 illustrates a schematic block diagram of another embodiment of a mobile communication device 600. The mobile communication device 600 includes a processor 605 (which may include a first control unit 601, a second control unit 602 and a third control unit 603), a data connection unit 604, and an identification card 606. The identification card 606 may be coupled to the processor 605 and may be used to store information used for establishing a data connection.

The data connection unit 604 may include a wireless transceiver 607 coupled to the processor 605. The data connection unit 604 establishes data connections with a communication networks. The first control unit 601 generates a first request for the mobile communication device 600 to obtain card information of an identification card 610 for a communication network 609 (e.g., wireless network). In some embodiments, the first control unit 601 may be similar to the first control unit 401 described in relation to FIGS. 4 and 5. The second control unit 602 controls the data connection unit 604 to establish a first data connection 608 with the communication network 609 corresponding to a current roaming location of the mobile communication device 600 in a roaming mode. The first data connection 608 is established based on card information of a preset card (e.g., identification card 606). The second control unit 602 sends the first request to a remote server 612 based on the first data connection 608 and receives the card information of the identification card 610 in response to sending the first request to the server 612. The second control unit 602 also controls the data connection unit 604 to establish a second data connection 614 with a communication network 616. The second data connection 614 is established based on the card information of the identification card 610.

In some embodiments, the data connection unit 604 performs a data transmission based on the second data connection 614. In various embodiments, the server manages identification cards for M communication networks (e.g., multiple communication networks) corresponding to different roaming locations, and M is a positive integer.

In various embodiments, the card information of the preset card enables the mobile communication device to establish a data connection with at least one communication network of the M communication networks.

In some embodiments, the mobile communication device 600 includes at least one communication subunit. The third control unit 603 determines whether the mobile communication device has an available communication subunit of the at least one communication subunit, obtains a result in response to determining whether the mobile communication device has an available communication subunit of the at least one communication subunit; and, in response to the result indicating an available communication subunit, loads the available communication subunit with the card information of the preset card.

In one embodiment, if the mobile communication device has two communication subunits, such as two modulation and demodulation modules, and if one modulation and demodulation module is available, the available communication subunit will be loaded with the card information of the preset card (e.g., VSIM-Te information).

The third control unit 603 may, in response to the result indicating an absence of an available communication subunit, unload a user identification card in a communication subunit of the at least one communication subunit, and load the communication subunit with the card information of the preset card. The user identification card may be used for establishing a third data connection between the mobile communication device and the communication network before roaming.

In certain embodiments, if the mobile communication device 600 has two communication subunits, such as two modulation and demodulation modules, and if both modulation and demodulation modules are in working status (e.g., the corresponding physical user identification cards have been inserted and activated), the user identification card corresponding to one of the modulation and demodulation modules may be unloaded, and the communication subunit will be loaded with the card information of the first preset card (e.g., VSIM-Te information).

In one embodiment, the second control unit 602 may read the card information of the communication subunit, and control the data connection unit 604 to establish the first data connection based on the card information read from the communication subunit.

In some embodiments, the second control unit 602 may unload the card information of the preset card in the communication subunit, load the communication subunit with the card information of the identification card, read the card information of the communication subunit, and control the data connection unit 604 to establish the second data connection based on the card information read from the communication subunit.

In various embodiments, the first control unit 601 generates a second request while the mobile communication device 600 is in the roaming mode. The second request indicates to the server 612 a reassignment of the card information of the identification card 610. Moreover, the second control unit 602 sends the second request to the server 612, and unloads the card information of the identification card from the communication subunit in response to sending the second request to the server 612.

The mobile communication device 600 may generate the second request before it quits roaming (e.g. the mobile communication device 600 is about to return to its origin from the roaming location), and sends the second request to the server 612 via the communication network 608 corresponding to the current roaming location to inform the server 612 to recover the card information of the identification card 610 that is currently used by the mobile communication device 600. That is, to inform the server 612 that the mobile communication device 600 is not going to use the card information of that identification card 610 any more, and that the server 612 may reassign the card information of the identification card 610 to other mobile communication devices that are roaming at the location.

Thus, provided that the user terminal does not enable international data roaming, and in the absence of any physical user identification card, the registration of the user identification card for the communication network at the roaming location enables the mobile communication device to use the mobile communication network at the roaming location to conduct data service transmission. Accordingly, cost on roaming data service may be reduced. Moreover, due to the settings of the first preset card, the mobile communication device may enable the roaming service at any time and/or any location. Furthermore, if the mobile communication device is using the identification card corresponding to the roaming location, the resource of such identification card is occupied, once the mobile communication device quits roaming, this identification card may be reassigned by the server to other mobile communication devices that are roaming at that location, and thus the identification card resource may be used efficiently, which may result in reduced hardware cost.

As used herein, the term unit may be interchanged with the term module. It may be understood that the devices and methods disclosed in the embodiments provided in the present disclosure may be implemented in other ways, as the device embodiments described above are merely illustrative. For example, the division of units is merely a division based on logical functions and there may be other ways of division in real practice. For example, multiple units or components may be combined, or may be integrated into another system, or some features may be omitted or not performed. Moreover, coupling, direct coupling, or communication connections among the component parts as shown or discussed may be implemented through some interface(s), and indirect coupling or communication connections of devices or units may be in an electrical, mechanical, or other form.

The units described as separate components may or may not be separated physically. The components illustrated as units may or may not be physical units; that is, they can be either located in one place or distributed over a plurality of network units. According to actual requirements, the object of the present solution of the embodiments can be achieved by some or all of the units.

Furthermore, in various embodiments of the present disclosure, all of the various functional units may be integrated in one processing module, each unit may function as a single unit, or two or more units may be integrated in one unit. The aforementioned integrated units may be realized by hardware, or by hardware plus a software functional unit.

A person skilled in the art may understand that all or part of the steps to realize the method embodiments described above may be accomplished by relevant hardware via program commands. The aforementioned program may be stored in a readable storage media of a computer. When the program runs, the portions of the method embodiments described above may be implemented. The aforementioned storage media include various types of media for program code storage, such as mobile storage device, Read-Only Memory ("ROM"), Random Access Memory ("RAM"), diskette or compact disc, and the like.

The above are only some specific embodiments of the present disclosure, and as such, the protection scope of the present disclosure is not limited thereto. Variations or alterations that are within the technical scope as disclosed in the present disclosure and readily conceived by those skilled in the art shall fall within the protection scope of the present disclosure. Accordingly, the protection scope of the present disclosure is defined by the claims.

What is claimed is:

1. A method comprising:
   determining that a preset card comprising first card information is built into a mobile communication device;
   activating a roaming function of the mobile communication device;
   generating a first request based on a current network environment and a capability of a modem that supports the current network environment;
   determining that the mobile communication device has no data roaming capability;
   in response to determining that the mobile communication device has no data roaming capability, determining whether there is an available communication subunit;
   in response to determining that there is not an available communication subunit, unloading a user identification card in a communication subunit and loading the communication subunit with the preset card;
   in response to determining that there is an available communication subunit, loading the preset card into the available communication subunit;
   establishing a first data connection between the mobile communication device and a communication network using the first card information;
   sending a request to a remote server via the first data connection to retrieve data for establishing a local data connection between the mobile communication device and the communication network, the request comprising a request for second card information for the identification card of the mobile communication device, wherein the first card information is used for international roaming, and the second card information is used for a current roaming location and enables data roaming;
   receiving the data from the remote server, wherein the data comprises the second card information;
   in response to receiving the data from the remote server, unloading the first card information from the communication subunit and loading the second card information into the communication subunit; and
   establishing a local data connection between the mobile communication device and the communication network using the second card information received from the remote server.

2. The method of claim 1, further comprising performing a data transmission between the mobile communication device and the communication network based on the local data connection.

3. The method of claim 1, wherein the server stores data relating to identification cards for a plurality of communication networks corresponding to different roaming locations.

4. The method of claim 1, further comprising generating said request for sending to the server, wherein generating said request comprises:
   detecting the communication network;
   obtaining a first parameter of the communication network;
   obtaining a second parameter of the communication network; and
   generating the request based on the first parameter and the second parameter.

5. The method of claim 1, wherein establishing the first data connection between the mobile communication device and the communication network further comprises:
   reading the first card information; and
   establishing the first data connection based on the first card information read.

6. The method of claim 1, wherein said request for sending to the server is automatically generated while the mobile communication device is in a roaming mode.

7. A mobile communication device comprising:
   a processor;
   a wireless transceiver coupled to the processor; and
   a preset card comprising first card information, the preset card built into the mobile communication device and coupled to the processor;
   wherein the processor is operable to:
     activate a roaming function of the mobile communication device;
     generate a first request based on a current network environment and a capability of a modem that supports the current network environment;
     determine that the mobile communication device has no data roaming capability;
     in response to determining that the mobile communication device has no data roaming capability, determine whether there is an available communication subunit;
     in response to determining that there is not an available communication subunit, unload a user identification card in a communication subunit and load the communication subunit with the preset card;
     in response to determining that there is an available communication subunit, load the preset card into the available communication subunit;
     establish a first data connection between the wireless transceiver and a communication network using the first card information;
     send a request to a remote server via the wireless transceiver to retrieve data for establishing a local data connection with the communication network, the request comprising a request for second card information for the identification card, wherein the first card information is used for international roaming, and the second card information is used for a current roaming location and enables data roaming;
     receive the data from the remote server, wherein the data comprises the second card information;
     in response to receiving the data from the remote server, unload the first card information from the communication subunit and load the second card information into the communication subunit; and
     establishing a local data connection with the communication network using the second card information received from the remote server.

8. The mobile communication device of claim 7, wherein the wireless transceiver operatively performs a data transmission via the local data connection.

9. The mobile communication device of claim 7, wherein the server stores data relating to identification cards for a plurality of communication networks corresponding to different roaming locations.

10. The mobile communication device of claim 7, wherein the processor comprises:
- a detection module that detects the communication network and obtains a first parameter of the communication network;
- an acquisition module that obtains a second parameter of the communication network; and
- a generation module that generates said request based on the first parameter and the second parameter.

11. The mobile communication device of claim 7, wherein the processor:
- reads the first card information; and
- controls the wireless transceiver to establish the first data connection based on the first card information as read.

12. The mobile communication device of claim 7, wherein:
- the processor generates said request for sending to the server while the mobile communication device is in a roaming mode.

13. A program product comprising a non-transitory computer readable storage medium that stores code executable by a processor, the executable code comprising code to perform:
- determining that a preset card comprising first card information is built into a mobile communication device;
- activating a roaming function of the mobile communication device;
- generating a first request based on a current network environment and a capability of a modem that supports the current network environment;
- determining that the mobile communication device has no data roaming capability;
- in response to determining that the mobile communication device has no data roaming capability, determining whether there is an available communication subunit;
- in response to determining that there is not an available communication subunit, unloading a user identification card in a communication subunit and loading the communication subunit with the preset card;
- in response to determining that there is an available communication subunit, loading the preset card into the available communication subunit;
- establishing a first data connection between the mobile communication device and a communication network using the first card information;
- sending a request to a server via the first data connection to retrieve data for establishing a local data connection between the mobile communication device and the communication network, the request comprising a request for second card information for the identification card of the mobile communication device, wherein the first card information is used for international roaming, and the second card information is used for a current roaming location and enables data roaming;
- receiving the data from the server, wherein the data comprises the second card information;
- in response to receiving the data from the remote server, unloading the first card information from the communication subunit and loading the second card information into the communication subunit; and
- establishing a local data connection between the mobile communication device and the communication network using the second card information received from the remote server.

14. The method of claim 13, wherein the executable code comprises code to perform performing a data transmission between the mobile communication device and the communication network based on the local data connection.

* * * * *